US00RE42568E

(19) United States
(12) Reissued Patent
Artemi

(10) Patent Number: US RE42,568 E
(45) Date of Reissued Patent: Jul. 26, 2011

(54) DEVICE FOR HOLDING GARMENT HANGERS

(76) Inventor: Paul Artemi, Middlesex (GB)

(21) Appl. No.: 11/397,053

(22) PCT Filed: Jul. 1, 1993

(86) PCT No.: PCT/GB93/01389

§ 371 (c)(1),
(2), (4) Date: Feb. 9, 1995

(87) PCT Pub. No.: WO93/24219

PCT Pub. Date: Dec. 9, 1993

Related U.S. Patent Documents

Reissue of:
(64) Patent No.: 5,584,455
Issued: Dec. 17, 1996
Appl. No.: 08/362,561
Filed: Feb. 9, 1995

(30) Foreign Application Priority Data

Jul. 3, 1992 (GB) ..... 9214229
Oct. 26, 1992 (GB) ..... 9222479

(51) Int. Cl.
*A47B 96/06* (2006.01)

(52) U.S. Cl. ..... 248/214; 248/215; 248/301; 248/340; 211/113; 223/85

(58) Field of Classification Search ..... 248/214, 248/215, 301, 304, 339, 340, 85; 223/85; 211/113

See application file for complete search history.

(56) References Cited

U.S. PATENT DOCUMENTS

| | | | | |
|---|---|---|---|---|
| 70,884 | A | 11/1867 | Oatley | |
| 311,246 | A | 1/1885 | Herrick et al. | |
| 491,062 | A | 1/1893 | Granger | |
| 593,609 | A | 11/1897 | Sampson | |
| 749,852 | A | 1/1904 | Dunn | |
| 829,239 | A | 8/1906 | Thompson et al. | |
| 1,054,750 | A * | 3/1913 | Cooper | 248/61 |
| 1,172,937 | A * | 2/1916 | Butcher | 211/113 |
| 1,333,692 | A | 3/1920 | Wester | |
| 1,360,103 | A | 11/1920 | Faistenhammer | |
| 1,467,848 | A | 9/1923 | Gibbs et al. | |
| 1,649,655 | A | 11/1927 | Benson | |
| 2,024,442 | A | 12/1935 | Flocco | |
| 2,125,770 | A | 8/1938 | Dabroski | |
| 2,232,249 | A | 2/1941 | Losin | |

(Continued)

FOREIGN PATENT DOCUMENTS

| | | | |
|---|---|---|---|
| CH | 111320 | 9/1925 | 211/113 |

(Continued)

*Primary Examiner* — Kimberly T Wood
(74) *Attorney, Agent, or Firm* — Pillsbury Winthrop Shaw Pittman LLP

(57) ABSTRACT

A device for holding garment hangers is described which has two parts: one preferably inflexible hook part made of plastics material or metal shaped to be carried by a rail and a flexible loop or strap or series of loops, adapted to receive many garment hangers. The two parts are connected flexibly and the loop may be adjusted to alter its separation from a rail. The device allows more garments to be hung from a single rail than previously was possible and is particularly useful in the transport and storage of garments in shops, warehouses and factories. Two devices may be interlocked across a handler's shoulders.

10 Claims, 5 Drawing Sheets

U.S. PATENT DOCUMENTS

| | | | | | |
|---|---|---|---|---|---|
| 2,454,698 | A | | 11/1948 | Hippler | |
| 2,499,188 | A | | 2/1950 | Freeman | |
| 2,555,181 | A | | 5/1951 | Brandt | |
| 2,609,104 | A | | 9/1952 | Leach | |
| 2,941,672 | A | * | 6/1960 | Lathrop | 211/85.3 |
| 2,997,217 | A | | 8/1961 | Levy | |
| 3,042,355 | A | | 7/1962 | Stevens | |
| D201,936 | S | | 8/1965 | Charak | |
| D204,376 | S | | 4/1966 | Garver | |
| 3,270,892 | A | | 9/1966 | Dennis et al. | |
| 3,318,224 | A | | 5/1967 | Bohanon | |
| 3,515,319 | A | | 6/1970 | Furtak et al. | |
| 3,578,226 | A | * | 5/1971 | Good | 294/137 |
| 3,584,772 | A | | 6/1971 | Robertson | |
| 3,630,475 | A | | 12/1971 | Barry | |
| 3,633,801 | A | | 1/1972 | Bonasso | |
| 3,710,996 | A | | 1/1973 | Smilow et al. | |
| 3,731,809 | A | | 5/1973 | Saenger | |
| 3,799,416 | A | | 3/1974 | Schmaltz | |
| 3,870,267 | A | | 3/1975 | Okle | |
| 3,907,118 | A | * | 9/1975 | Pelavin | 211/113 |
| 3,972,455 | A | | 8/1976 | Collins | |
| 3,993,205 | A | | 11/1976 | Pilchard | |
| 4,008,835 | A | | 2/1977 | Budzik | |
| 4,063,669 | A | | 12/1977 | Smilow et al. | |
| 4,091,976 | A | | 5/1978 | Morse | |
| 4,136,784 | A | | 1/1979 | Knobel et al. | |
| 4,153,189 | A | * | 5/1979 | Hughes | 294/143 |
| 4,162,753 | A | | 7/1979 | Brown | |
| 4,221,298 | A | | 9/1980 | Wright et al. | |
| 4,265,380 | A | | 5/1981 | Webster et al. | |
| 4,299,342 | A | | 11/1981 | Kessler et al. | |
| 4,335,839 | A | | 6/1982 | Kessler et al. | |
| 4,368,865 | A | | 1/1983 | Kolbe | |
| 4,399,918 | A | | 8/1983 | Clements | |
| 4,557,516 | A | * | 12/1985 | Usner | 294/143 |
| 4,714,156 | A | | 12/1987 | Kolton et al. | |
| 4,718,546 | A | | 1/1988 | Kolton et al. | |
| 4,738,424 | A | | 4/1988 | Conner | |
| 4,811,475 | A | | 3/1989 | Morton, Jr. | |
| D301,522 | S | | 6/1989 | Kolton et al. | |
| 4,856,688 | A | * | 8/1989 | Ackmann | 224/217 |
| 4,858,867 | A | | 8/1989 | King | |
| 4,903,922 | A | | 2/1990 | Harris, III | |
| 4,909,466 | A | | 3/1990 | Matthews | |
| 4,911,394 | A | | 3/1990 | Ericson | |
| 4,957,259 | A | * | 9/1990 | Wolf, Jr. | 248/304 |
| 5,050,833 | A | | 9/1991 | Usner | |
| 5,083,690 | A | | 1/1992 | Winskas | |
| 5,107,996 | A | | 4/1992 | Whittaker | |
| 6,042,355 | A | * | 3/2000 | Murphy et al. | 425/130 |

FOREIGN PATENT DOCUMENTS

| | | | |
|---|---|---|---|
| FR | 454516 | 4/1913 | 211/113 |

* cited by examiner

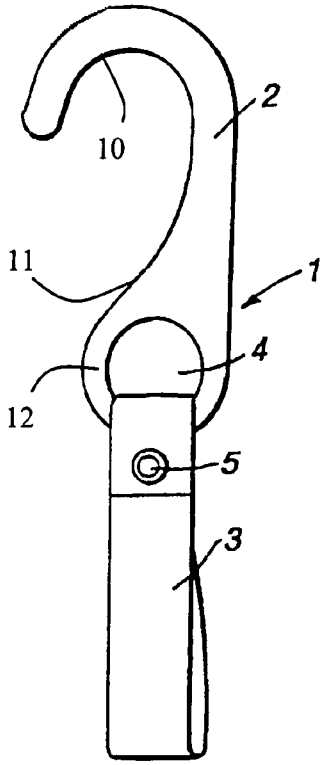
FIG. 1
AMENDED
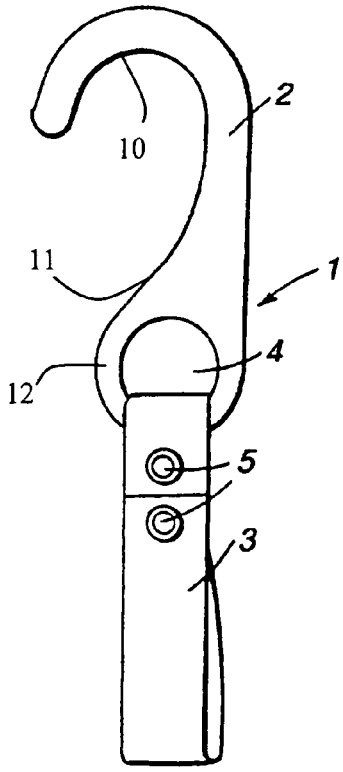
FIG. 1a
AMENDED

DEVICE FOR HOLDING GARMENT HANGERS

Matter enclosed in heavy brackets [ ] appears in the original patent but forms no part of this reissue specification; matter printed in italics indicates the additions made by reissue.

FIELD OF THE INVENTION

The present invention relates to devices for holding garment hangers, particularly for hanging garments on a rail.

BACKGROUND OF THE INVENTION

The number of garments which can be hung on any one rail is traditionally limited by the bulk of the hangers used. The modern trend for shoulder pads in many garments also adds to the bulk and reduces the space available.

SUMMARY OF THE INVENTION

According to the present invention, there is provided a device comprising a first part, preferably in the form of a hook, shaped and adapted to be carried by a rail, and a second part comprising a loop adapted to support a plurality of garment hangers so as to increase the number of hangers which can be carried by the rail.

Preferably, the second part is flexibly connected to the first part and may itself be flexible and in the form of a strap and is adjustable to alter the separation of the loop from a rail carrying the first part.

The flexible strap may comprise a plurality of loops.

In one embodiment, the first part is a hook in the form of a closed loop for permanent attachment to a rail. Alternatively it comprises a latched element to resist inadvertent displacement from a rail.

Preferably the first part is made of an inflexible, strong material such as a plastics material or metal.

A device according to the invention is particularly useful in shops, warehouses and factories though it can also be used in domestic situations.

It is also useful in the transport of garments, either carried by a rail in a van or to facilitate carrying many garments by hand. For example two devices may be interlocked across a handler's shoulder. FIG. 1a shows the inventive device with an adjustable loop.

BRIEF DESCRIPTION OF THE DRAWINGS

The invention will now be described by way of example, with reference to the accompanying drawings in which:

FIG. 1 shows a device according to the invention;

DETAILED DESCRIPTION OF THE INVENTION

Figure 2:
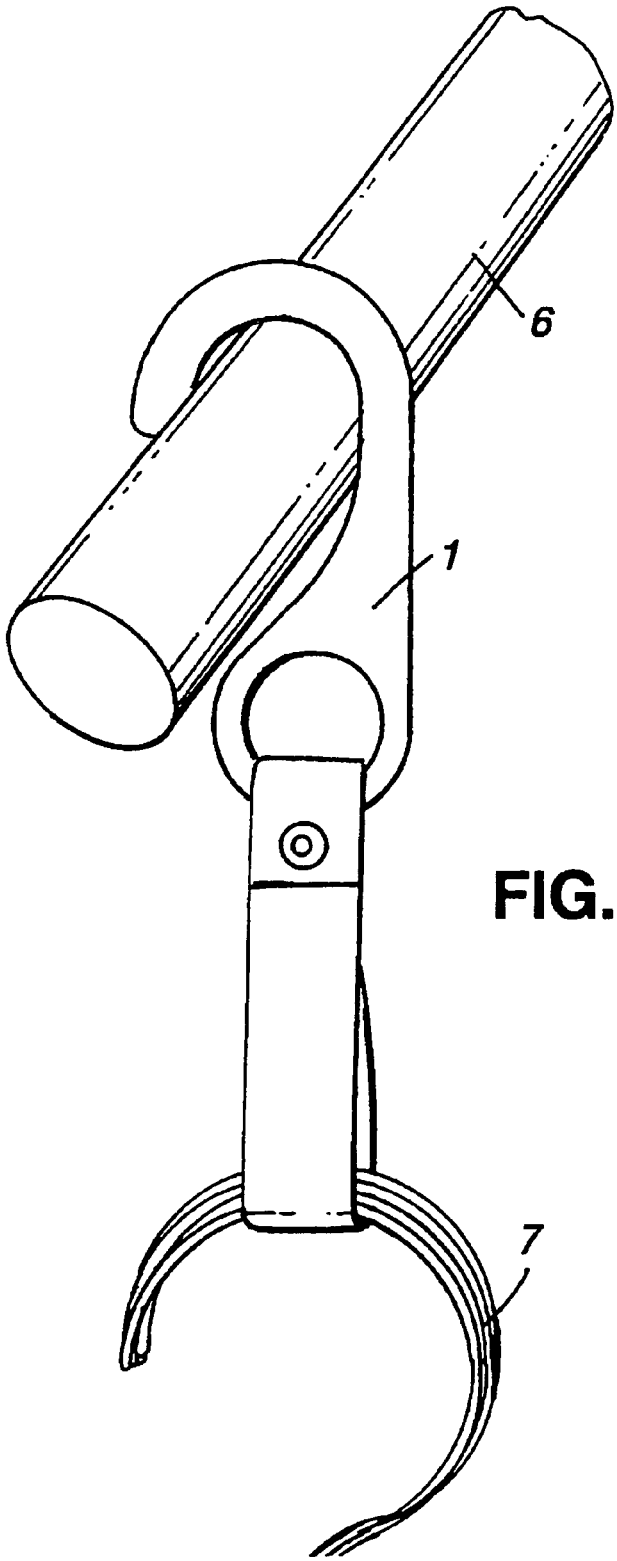
FIG. 2 shows the device of FIG. 1, in use, in perspective view.

The device 1 of FIG. 1 has a hooked portion 2 made of rigid plastics material with a flexible strap 3 attached. *As can be seen clearly in the drawings, the hooked portion 2 has an arcuate lower surface 10 that is shaped and adapted to be carried directly on a rail. The arcuate lower surface 10 is smooth for sliding on the rail.* The flexible strap forms a closed loop passing through hole 4 in *ring 12 that is formed continuously together with* hooked portion 2 [and]. *The ring 12 has a curved, upper surface 11 on the exterior that faces internally with respect to hooked portion 2. The strap forms parallel side walls of the loop when* fastened with a rivet 5. The rivet 5 may alternatively be a latched fastening fastener and may be adjustable to allow adjustment of the position of the loop relative to the hooked portion 2 and thus to a rail from which garments are to be hung, as shown in FIG. 1a. The loop could also be formed by stitching the strap.

FIG. 2 shows the device 1 hung on a rail 6 with several traditional garment hangers 7 supported in the loop of the strap 3.

Figure 3:
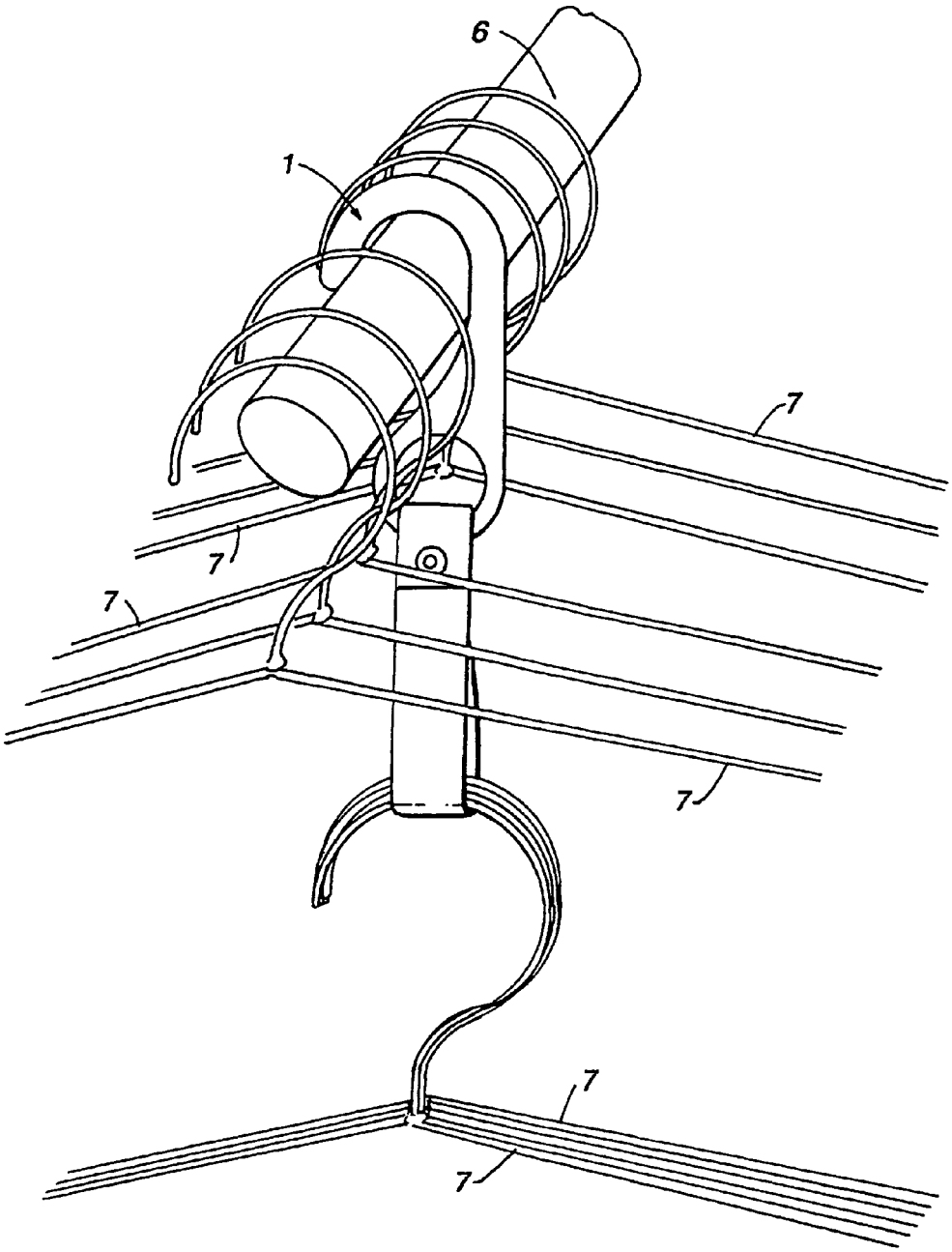
FIG. 3 shows the device of FIG. 1 in use on a rail together with traditional garment hangers.

The advantage of the device 1 can be seen in FIG. 3 where its use on rail 6, already crowded with traditional hangers 7, enables several (here five) more garment hangers 7 to be supported than would be possible without the device 1.

Figure 4:
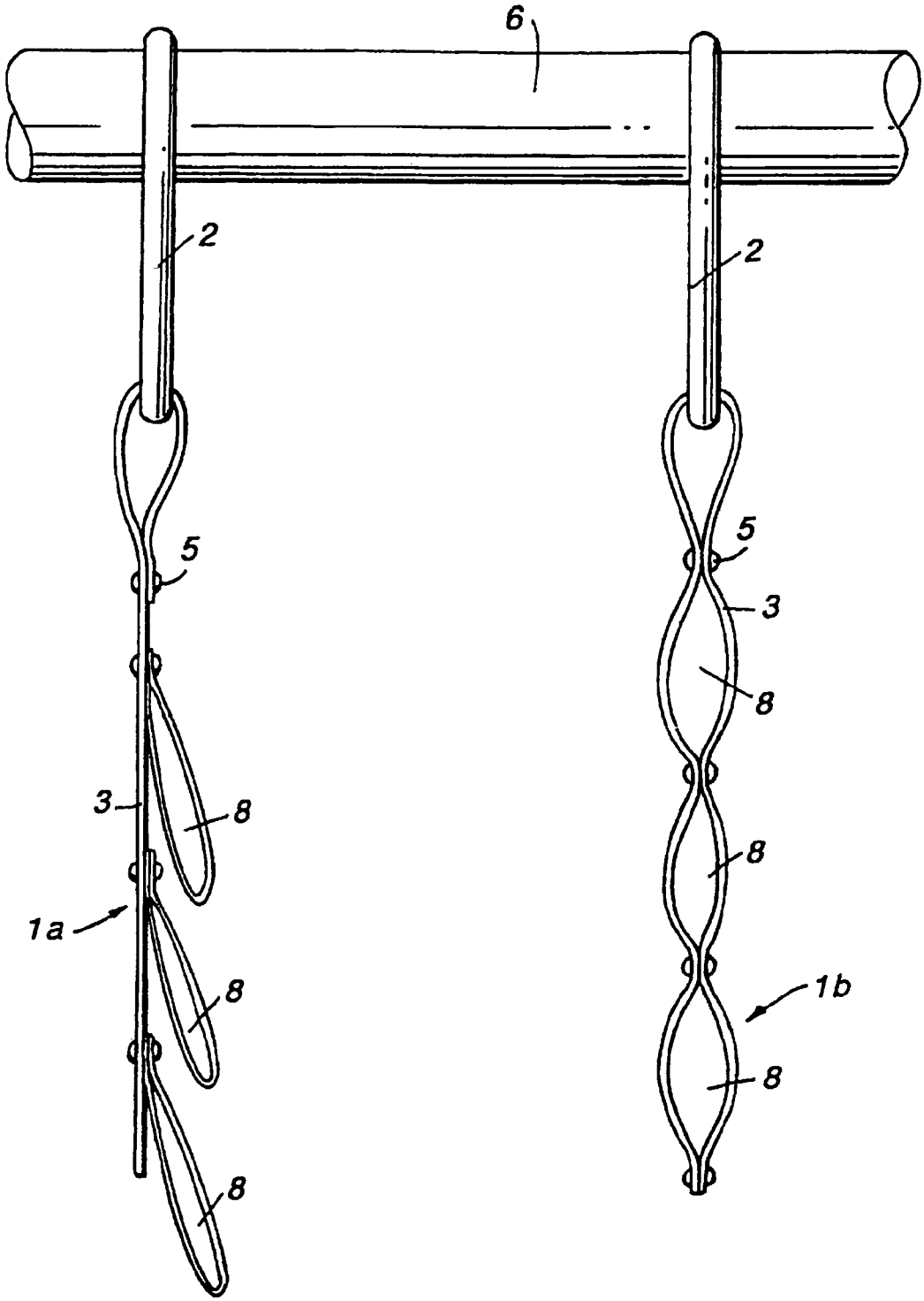
FIG. 4 shows two alternative embodiments of the device of the invention.

FIG. 4 shows two alternative embodiments of the device 1a and 1b, each comprising three loops 8 for supporting yet more garment hangers than would traditionally be possible on rail 6. In device 1a, the loops 8 comprise separate sections of flexible strap riveted onto a length of strap 3 supported by hooked portion 2. In device 1b, the loops 8 are formed by riveting together a double length of strap 3 at spaced locations.

A device according to the invention is particularly versatile. For example, two devices can be attached together by the hooked portions and hung over a handler's shoulder enabling the handler to carry several garments in front and several behind yet still have his hands free.

When the device 1 is used on a rail, a second rail can be hung below the first by insertion into loops of two spaced devices. Alternatively, the flexibility of the strap 3 enables the loops to be twisted so that a rail may be hung perpendicular to and between two parallel rails, for example in a van.

Figure 5:
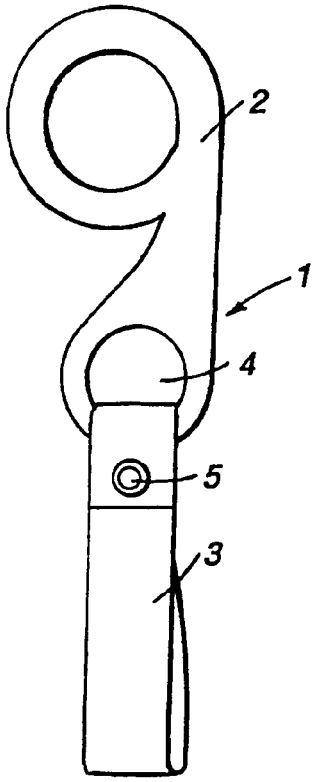
FIGS. 5 and 6 show alternative forms of the hooked portion of the device.
Figure 6:
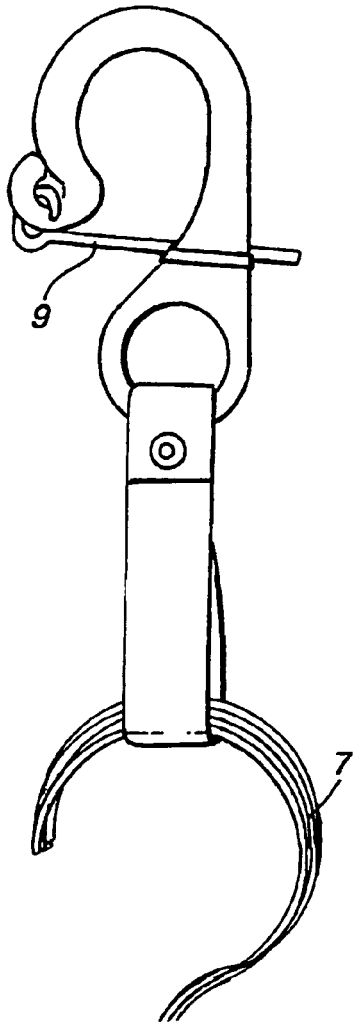

The hooked portion may be an open hook as shown in FIGS. 1-4 or may be closed for permanent mounting on a rail as shown in FIG. 5, or may a comprise a latched element to resist inadvertent detachment from the rail as shown in FIG. 6.

The strap 3 is preferably made from a strong webbing material and could be made detachable from the hook portion so that worn straps could be periodically and easily replaced and/or washed.

The looped portion for holding the garment hangers could alternatively be made of a solid plastics material.

I claim:

[1. A device for holding garment hangers, the device comprising:

a first part formed of substantially rigid plastics material and being in the form of a hook having an arcuate lower surface shaped and adapted to be carried directly on a rail, the arcuate lower surface being smooth so as to slide on the rail adjacent to garment hangers hung directly on the rail, the first part further having a ring spaced from the hook, the ring having a curved upper internal surface to facilitate carrying a plurality of garments by hand; and a second part comprising a loop in the form of a strap of flexible webbing attached to the first part through the ring, the loop having two parallel side walls extending generally in the same plane as the hook, and providing adapted to provide lateral support for garment hangers in the loop to keep them in an orientation substantially parallel to the garment hangers hung directly on the rail, so as to increase the number of hangers which can be carried by the rail.]

2. *A device* [according to claim 1,] *for holding garment hangers, the device comprising:*

*a first part formed of substantially rigid plastics materials and being in the form of a hook having an arcuate lower surface shaped and adapted to be carried directly on a rail, the arcuate lower surface being smooth so as to slide on the rail adjacent to garment hangers hung directly on the rail, the first part further having a ring spaced from the hook, the ring having a curved upper internal surface to facilitate carrying a plurality of garments by hand; and*

*a second part comprising a loop in the form of a strap of flexible webbing attached to the first part through the ring, the loop having two parallel side walls extending generally in the same plane as the hook, and adapted to provide lateral support for garment hangers in the loop to keep them in an orientation substantially parallel to the garment hangers hung directly on the rail, so as to increase the number of hangers which can be carried by the rail,* wherein the second part further comprises adjustable means for altering the distance between the second part and the first part.

[3. A device according to claim 1, wherein the second part comprises a plurality of loops.]

[4. A device according to claim 1, wherein the first part is a hook in the form of a closed loop for permanent attachment to a rail.]

[5. A device according to claim 1, wherein the first part further comprises a latched element for resisting inadvertent displacement from a rail.]

[6. A method of hanging garments from a rail, comprising hanging the hook of a device according to claim 1 on the rail, and supporting at least one garment hanger in the loop of the device.]

[7. A method of hanging garments from a rail, comprising hanging two devices according to claim 1, at spaced positions on a rail, and suspending a second rail by means of the loops of the two spaced devices.]

*8. A device for holding garment hangers, the device comprising:*

*a first part formed of substantially rigid plastics material and being in the form of a hook having an arcuate lower surface shaped and adapted to be carried directly on a rail, the arcuate lower surface being smooth so as to slide on the rail adjacent to garment hangers hung directly on the rail, the first part further having a ring spaced from the hook, the ring having a curved upper internal surface located on an exterior of the ring and facing internally with respect to the hook to facilitate carrying a plurality of garments by hand, wherein the ring and the hook are formed continuously together as one piece from the plastics material; and*

*a second part comprising a loop in the form of a strap of flexible webbing attached to the first part through the ring, the loop having two parallel side walls extending generally in the same plane as the hook, the side walls having a width that is substantially greater than the thickness so as to provide lateral support for garment hangers in the loop to keep them in an orientation substantially parallel to the garment hangers hung directly on the rail, so as to increase the number of hangers which can be carried by the rail.*

*9. A device according to claim 8, wherein the second part further comprises adjustable means for altering the distance between the second part and the first part.*

*10. A device according to claim 8, wherein the second part comprises a plurality of loops.*

*11. A device according to claim 8, wherein the first part further comprises a latched element for resisting inadvertent displacement from a rail.*

*12. A device for holding garment hangers, the device comprising:*

*a first part formed of substantially rigid plastics material and being in the form of a hook having an arcuate lower surface shaped and adapted to be carried directly on a rail, the arcuate lower surface being smooth so as to slide on the rail adjacent to garment hangers hung directly on the rail, the first part further having a ring spaced from the hook, the ring having a curved upper internal surface to facilitate carrying a plurality of garments by hand; and*

*a second part comprising a loop in the form of a strap of flexible webbing attached to the first part through the ring, the loop having two parallel side walls extending generally in the same plane as the hook, the side walls having a width that is substantially greater than the thickness so as to provide lateral support for garment hangers in the loop to keep them in an orientation substantially parallel to the garment hangers hung directly on the rail, so as to increase the number of hangers which can be carried by the rail,*

*wherein the second part further comprises adjustable means for altering the distance between the second part and the first part.*

*13. A device for holding garment hangers, the device comprising:*

*a first part formed of substantially rigid plastics material and being in the form of a hook having an arcuate lower surface shaped and adapted to be carried directly on a rail, the arcuate lower surface being smooth so as to slide on the rail adjacent to garment hangers hung directly on the rail, the first part further having a ring spaced from the hook, the ring having a curved upper internal surface to facilitate carrying a plurality of garments by hand; and*

*a second part comprising a loop in the form of a strap of flexible webbing attached to the first part through the ring, the loop having two parallel side walls extending generally in the same plane as the hook, and adapted to provide lateral support for garment hangers in the loop to keep them in an orientation substantially parallel to the garment hangers hung directly on the rail, so as to increase the number of hangers which can be carried by the rail,*

*wherein the first part further comprises a latched element for resisting inadvertent displacement from a rail.*

*14. A method of hanging garments from a rail, comprising:*

*hanging two devices for holding garment hangers at spaced positions on a rail, each device comprising a first part formed of substantially rigid plastics material and being in the form of a hook having an arcuate lower surface shaped and adapted to be carried directly on a rail, the arcuate lower surface being smooth so as to slide on the rail adjacent to garment hangers hung directly on the rail, the first part further having a ring spaced from the hook, the ring having a curved upper internal surface to facilitate carrying a plurality of garments by hand; and a second part comprising a loop in the form of a strap of flexible webbing attached to the*

*first part through the ring, the loop having two parallel side walls extending generally in the same plane as the hook, and adapted to provide lateral support for garment hangers in the loop to keep them in an orientation substantially parallel to the garment hangers hung directly on the rail, so as to increase the number of hangers which can be carried by the rail; and*

*suspending a second rail by means of the loops of the two spaced devices.*

*15. A method of hanging garments from a rail, the method comprising:*

*providing a first device for holding garment hangers, comprising:*

*(i) a first part of substantially rigid plastics material in the form of a hook having an arcuate lower surface shaped and adapted to be carried directly on a rail, the arcuate lower surface being smooth so as to slide on the rail adjacent to garment hangers hung directly on the rail, the first part further having a ring spaced from the hook, the ring having a curved upper internal surface located on an exterior of the ring and facing internally with respect to the hook to facilitate carrying a plurality of garments by hand, wherein the ring and the hook are formed continuously together as one piece from the plastics material; and*

*(ii) a second part comprising a loop in the form of a strap of flexible webbing attached to the first part through the ring, the loop having two parallel side walls extending generally in the same plane as the hook, the side walls having a width that is substantially greater than the thickness so as to provide lateral support for garment hangers in the loop to keep them in an orientation substantially parallel to the garment hangers hung directly on the rail, so as to increase the number of hangers which can be carried by the rail;*

*inserting at least one garment hanger with a garment hanging thereon into the loop between the two side walls; and*

*hanging the hook on a rail with the arcuate lower surface directly engaging the rail.*

*16. A method according to claim 15, further comprising:*

*providing a second device for holding garment hangers, the second device comprising:*

*(i) a first part of substantially rigid plastics material in the form of a hook having an arcuate lower surface shaped and adapted to be carried directly on a rail, the arcuate lower surface being smooth so as to slide on the rail adjacent to garment hangers hung directly on the rail, the first part further having a ring spaced from the hook, the ring having a curved upper internal surface located on an exterior of the ring and facing internally with respect to the hook to facilitate carrying a plurality of garments by hand, wherein the ring and the hook are formed continuously together as one piece from the plastics material; and*

*(ii) a second part comprising a loop in the form of a strap of flexible webbing attached to the first part of the second device through the ring, the loop having two parallel side walls extending generally in the same plane as the hook, the side walls having a width that is substantially greater than the thickness so as to provide lateral support for garment hangers in the loop to keep them in an orientation substantially parallel to the garment hangers hung directly on the rail, so as to increase the number of hangers which can be carried by the rail;*

*inserting at least one garment hanger with a garment hanging thereon into the loop of the second device; and*

*hanging the hook of the second device in the loop of the first device.*

* * * * *